United States Patent
Cumby et al.

[11] Patent Number: 5,878,982
[45] Date of Patent: Mar. 9, 1999

[54] STAND FOR SUPPORTING FLORAL DEVICE

[76] Inventors: Randy L. Cumby; Mary K. Cumby, both of Rte. 3, #35, Triple L Acres, Altus, Okla. 73521

[21] Appl. No.: 823,775

[22] Filed: Mar. 24, 1997

[51] Int. Cl.$^6$ .................................................... A47G 7/00
[52] U.S. Cl. ...................... 248/27.8; 211/13.1; 248/176.1
[58] Field of Search .................................. 248/27.8, 174, 248/176.1; 211/70.1, 85.2, 85.3, 85.7, 42, 13.1, 70.6; 40/657; 47/41.01, 41.15; D11/143, 146

[56] References Cited

U.S. PATENT DOCUMENTS

| | | |
|---|---|---|
| D. 98,549 | 2/1936 | Sharp . |
| D. 159,658 | 8/1950 | McCallum et al. ................. 248/27.8 X |
| D. 320,324 | 10/1991 | Siembieda et al. . |
| 185,468 | 12/1876 | Archer . |
| 342,675 | 5/1886 | Braddock . |
| 1,263,323 | 4/1918 | Kaempf .................................. 248/513 |
| 1,369,089 | 2/1921 | Duff . |
| 1,712,858 | 5/1929 | Tsuchii . |
| 1,752,655 | 4/1930 | Scherotto ................................ 248/174 |
| 1,801,058 | 4/1931 | Sutcliffe . |
| 1,827,731 | 10/1931 | Churchill .................................. 40/406 |
| 1,885,879 | 11/1932 | Whittington . |
| 1,946,779 | 2/1934 | Conway .............................. 248/174 X |
| 2,217,454 | 10/1940 | Pfeiffer . |
| 2,358,295 | 9/1944 | Bacigalapi . |
| 2,779,459 | 1/1957 | Waterman . |
| 3,158,524 | 11/1964 | Tong . |
| 3,164,344 | 1/1965 | Whyte .................................... 248/512 |
| 3,169,897 | 2/1965 | Yue . |
| 3,883,990 | 5/1975 | Stidolph . |
| 3,924,750 | 12/1975 | Dunchock ................................ 211/13 |
| 4,204,602 | 5/1980 | Dunchock ................................ 211/13 |
| 4,212,133 | 7/1980 | Lufkin . |
| 4,310,095 | 1/1982 | Fontlladosa . |
| 4,531,638 | 7/1985 | Jacobozzi et al. . |
| 4,584,213 | 4/1986 | Rentowl . |
| 4,773,173 | 9/1988 | Christian . |
| 4,917,240 | 4/1990 | Roberts et al. . |
| 5,165,534 | 11/1992 | Kaufman et al. . |
| 5,216,835 | 6/1993 | Domurat ................................. 47/41.01 |
| 5,217,117 | 6/1993 | Tsuji . |
| 5,244,700 | 9/1993 | Banschick . |
| 5,297,677 | 3/1994 | Burian et al. ........................ 248/174 X |
| 5,301,463 | 4/1994 | Domurat ................................. 47/41.01 |
| 5,380,568 | 1/1995 | Banschick . |
| 5,454,189 | 10/1995 | Graham et al. ......................... 47/41.12 |
| 5,522,574 | 6/1996 | Maglione ................................ 248/174 |

FOREIGN PATENT DOCUMENTS

| | | |
|---|---|---|
| 197805 | 1/1907 | Germany . |
| 2431336 | 8/1976 | Germany . |
| 674897 | 5/1950 | United Kingdom . |

OTHER PUBLICATIONS

American Floral Container, Inc., commercial brochure, published prior to Feb. 1997 (2 pages).

Lomey, advertisement for bouquet stands, published prior to Feb. 1997 (1 page).

Tapscott's spring 1997 catalog, published prior to Feb. 1997, pp. 171–173, 175 (5 pages).

*A Flower, Symbol of Joy & Hope, is the Heart of a Wedding Celebration*, article appearing in The Professional Floral Designer, Jan./Feb. 1997, pp. 34–36 (3 pages).

*Make a Sweeping Statement*, article appearing in The Professional Floral Designer, Jan./Feb. 1997, pp. 37 (1 page).

(List continued on next page.)

*Primary Examiner*—Derek J. Berger
*Attorney, Agent, or Firm*—Mary M. Lee

[57] ABSTRACT

A stand for supporting a floral device such as a bouquet holder or a foam block. The stand is integrally formed of transparent plastic and has a front panel and parallel back panel spaced a distance behind the front panel, all supported at a slight angle on a flat base. Openings are provided in the front panel for receiving the stem of a bouquet holder, and the free end of the bouquet holder slides down into a vertical groove on back panel. Foam blocks may be used by arranging a number of removable pegs on the front panel. Thus, this versatile and attractive stand can be used to prepare, store, transport and display a floral arrangement.

27 Claims, 4 Drawing Sheets

OTHER PUBLICATIONS

*Three Essentials for Developing a Competitive Edge in the Bridal Market*, article appearing in The Professional Floral Designer, Jan./Feb. 1997, pp. 38–39 (2 pages).

Vacuum Orna–Metal, Inc., advertisement appearing Florist magazine, Aug. 1996, pp. 40–41 (2 pages).

Smithers–Oasis U.S.A., advertisement appearing in Florist magazine, May 1996, pp. 54–55 (2 pages).

Vacuum Orna–Metal, Inc., advertisement appearing in Florist magazine, May 1996, p. 93 (inside back cover) (1 page).

Reauco, Inc., advertisement appearing in Professional Floral Designer, Nov./Dec. 1995, p. 30 (1 page).

Excelsior Plastics Industry, advertisement appearing in Professional Floral Designer, Sep./Oct. 1995, p. 39 (1 page).

Diamond–Line Containers, advertisement appearing in Professional Floral Designer, Sep./Oct. 1995, pp. 56–57 (2 pages).

Lomey Manufacturing Corp., advertisement appearing in Professional Floral Designer, Sep./Oct. 1995, p. 97 (inside back cover) (1 page).

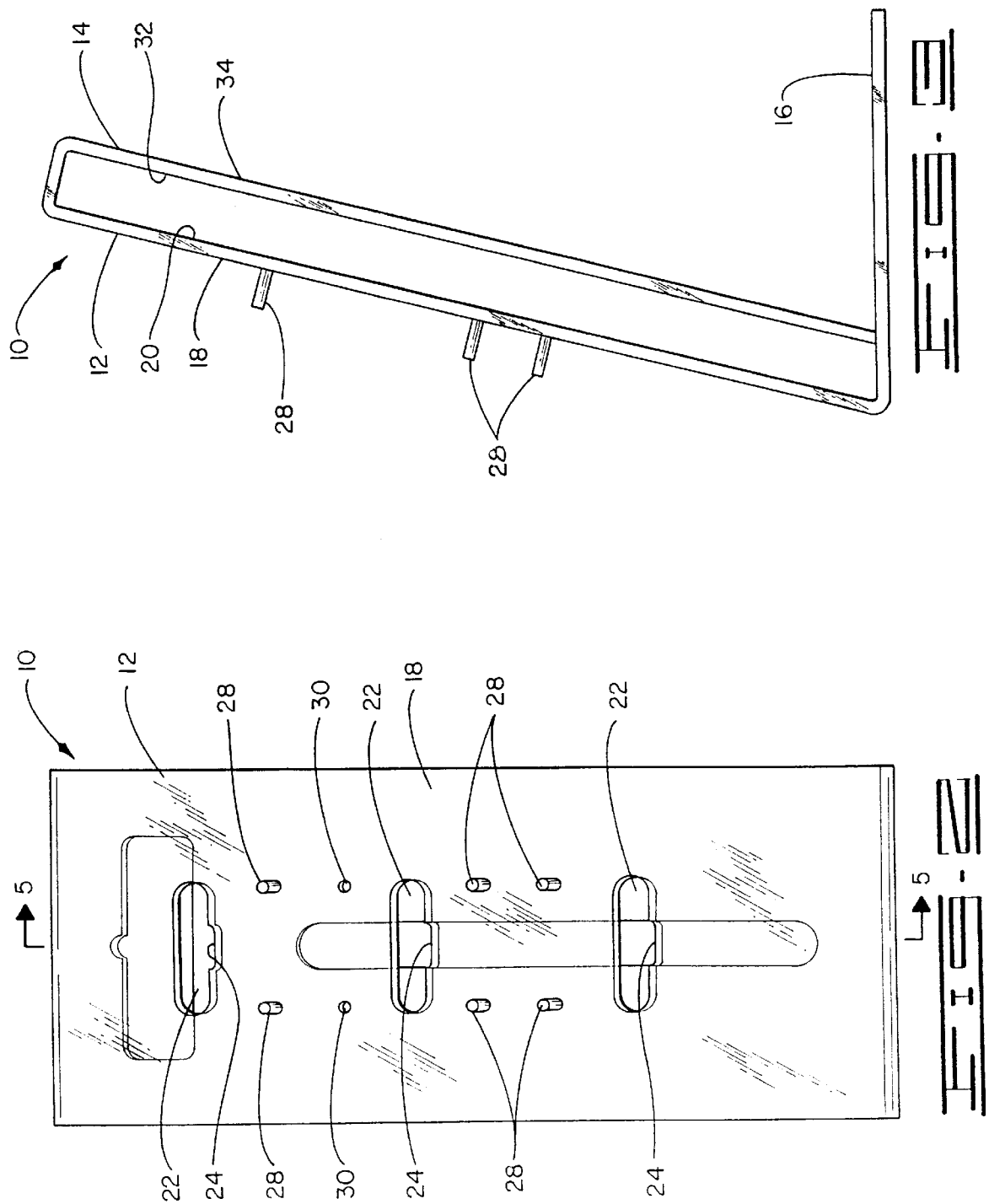

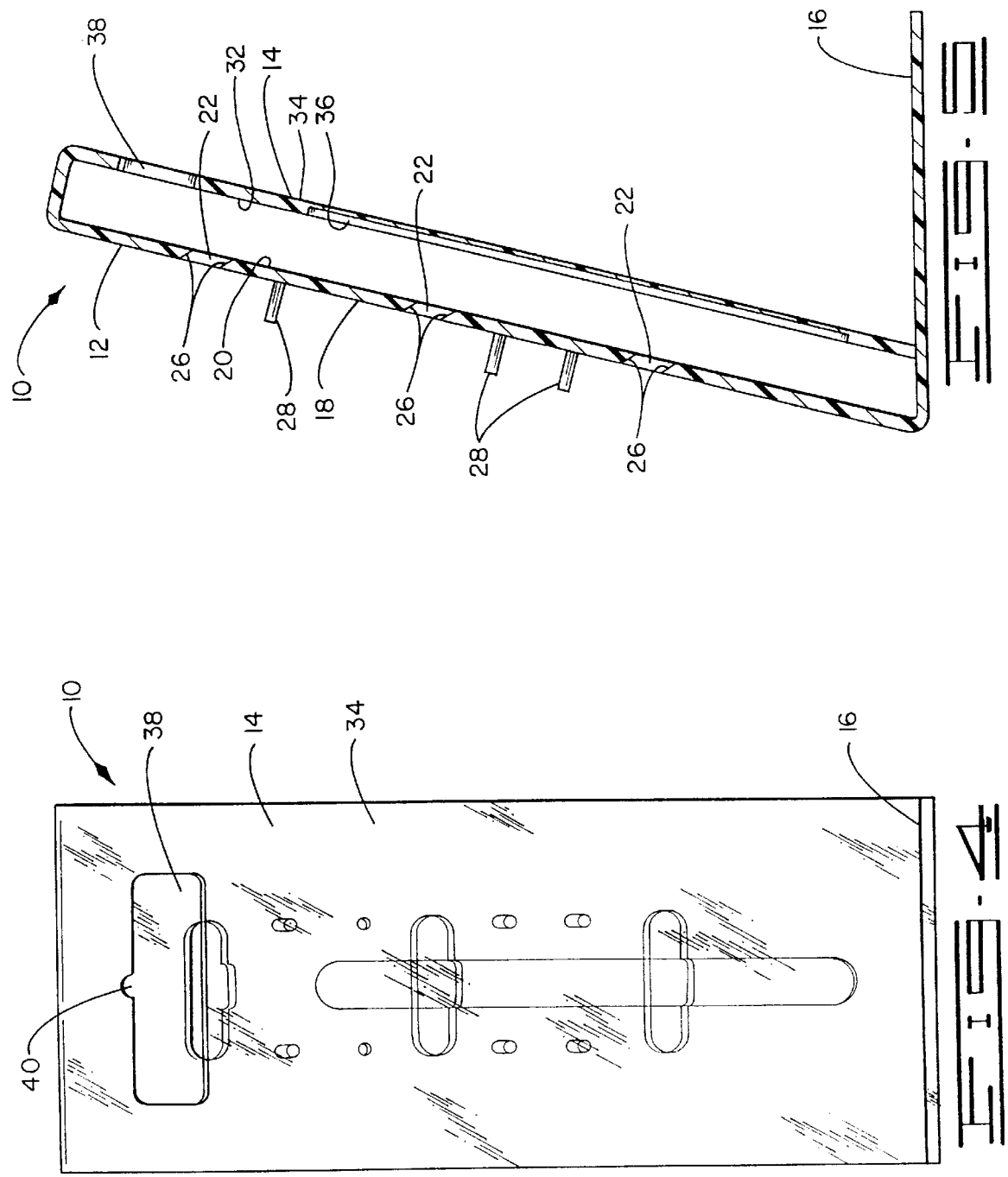

5,878,982

STAND FOR SUPPORTING FLORAL DEVICE

FIELD OF THE INVENTION

The present invention relates generally to floral devices and, more particularly, to stands for supporting floral devices.

SUMMARY OF THE INVENTION

The present invention comprises a stand for supporting a floral device. The stand has a front panel with an interior face and an exterior face. Formed in the front panel is at least one receiving opening adapted to receive a portion of the floral device. The stand further comprises a back panel that has an interior face and an exterior face. The back panel is generally parallel to and spaced a distance behind the front panel. The interior face of the back panel comprises an elongate groove aligned with the receiving opening in the front panel.

Further, the present invention comprises a stand for supporting a bouquet holder comprising a floral portion attached to one end of an elongate, resilient stem. The stand comprises a front panel that has an interior face and an exterior face. The front panel defines at least one receiving opening adapted to receive the free end of the stem of the bouquet holder so that the floral portion is supported on the exterior face of the front panel while the stem extends behind the front panel. The stand further comprises a back panel that has an interior face and an exterior face. The back panel is generally parallel to and spaced a distance behind the front panel. The interior face of the back panel comprises and elongate groove aligned with the receiving opening in the front panel. The elongate groove is adapted to receive and appressingly engage the free end of the stem of the bouquet holder so that the bouquet holder is stabilized in the stand.

Still further, the present invention is directed to a bouquet holder assembly. The assembly includes a bouquet holder and a stand. The bouquet holder comprises a floral portion attached to one end of an elongate, resilient stem. The stand comprises a front panel that has an interior face and an exterior face. The front panel defines at least one receiving opening adapted to receive the free end of the stem of the bouquet holder so that the floral portion is supported on the exterior face of the front panel and the free end of the stem extends behind the front panel. The stand further comprises a back panel that has an interior face and an exterior face. The back panel is generally parallel to and spaced a distance behind the front panel. The interior face of the back panel comprises and elongate groove aligned with the receiving opening in the front panel. The elongate groove is adapted to receive and appressingly engage the free end of the stem of the bouquet holder so that the bouquet holder is stabilized in the stand.

BRIEF DESCRIPTION OF THE DRAWINGS

FIG. 2 is a front elevational view of the stand shown in FIG. 1. The foam block is omitted.

FIG. 3 is a side elevational view of the stand shown in FIG. 2.

FIG. 4 is a rear elevational view of the stand shown in FIG. 2.

FIG. 5 is a longitudinal sectional view of the stand, taken along line 3—3 of FIG. 2.

The foam block is removed, and a bouquet holder is shown supported therein.

DETAILED DESCRIPTION OF THE PREFERRED EMBODIMENT

Florists create floral arrangements such as floral sprays and bouquets using a variety of devices such as foam blocks and bouquet holders. During assembly of the floral arrangement, the stems of flowers, picks, wires and other floral accessories are pressed into the foam block or bouquet holder. There is a need for a floral stand which can support the floral device while the florist works on it, as this allow the florist to have both hands free to manipulate the delicate flowers and various accessories.

In accordance with the present invention a stand is provided which supports the floral device in an upright position on virtually any work surface chosen by the florist. The stand of this invention can be used to support several different floral devices, and allows convenient manipulation of wires and ribbons and the like.

Moreover, due to its solid sturdy construction, the stand of this invention can be used to store and to transport the fully assembled floral arrangement. This eliminates the need to remove the arrangement from the stand and package it safely for shipment, which reduces the likelihood that the arrangement will be damaged.

Still further, the simple elegant appearance of the stand of this invention provides an aesthetically pleasing display stand for the arrangement. This eliminates yet another opportunity for damage to the arrangement and the delicate flowers within it. This also simplifies the use of the arrangement at events, such as weddings and funerals, where it may be necessary to rapidly set up and dissemble a grouping of large floral arrangements with minimal disruption of the ceremony.

Figure 1:
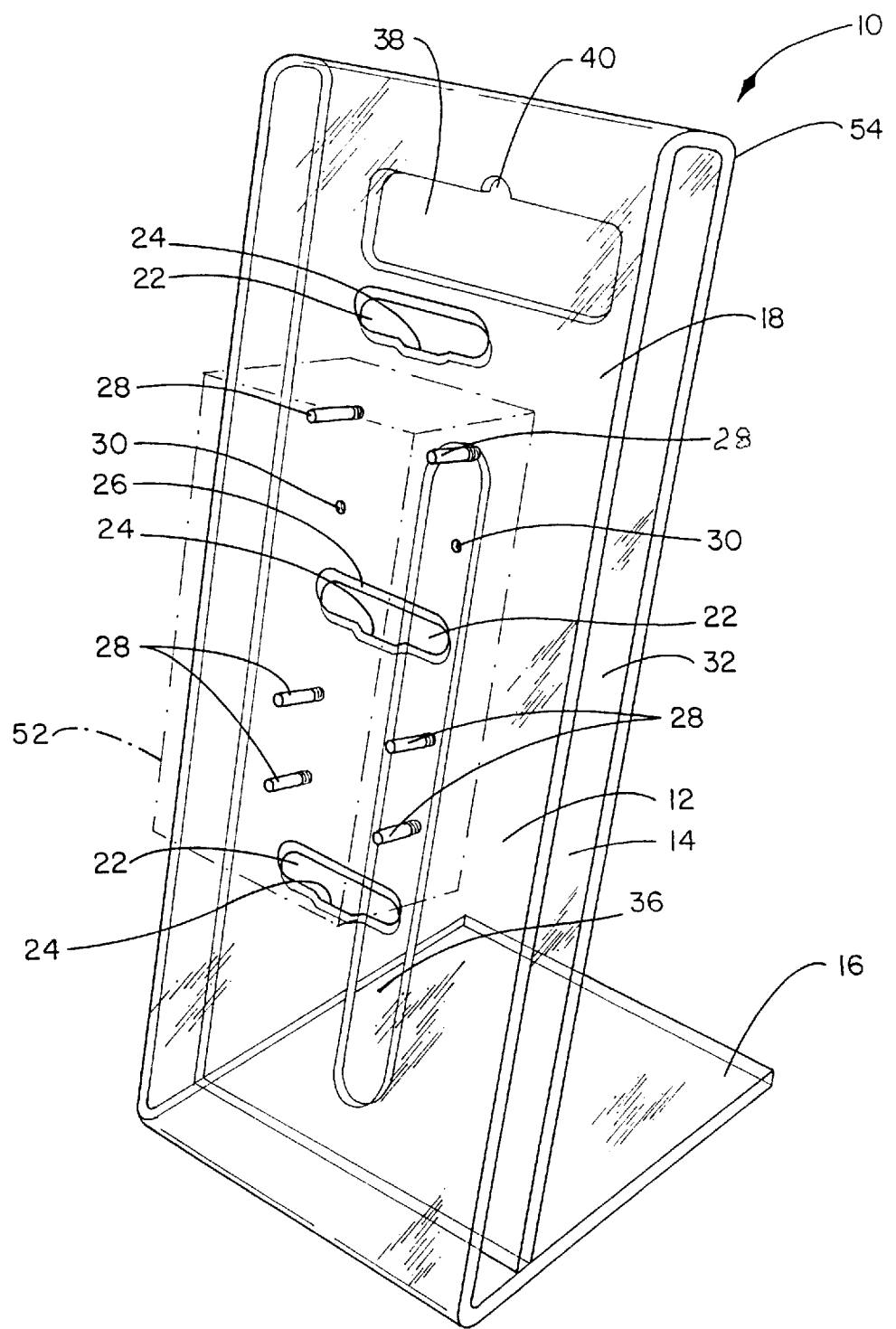
FIG. 1 is a right, frontal perspective view of a stand constructed in accordance with the present invention. Shown in phantom is a foam block supported on the stand.

With reference now to the drawings in general and to FIG. 1 in particular, there is shown therein a stand constructed in accordance with the present invention and designated generally by the reference numeral 10. The stand 10 generally comprises a front panel 12 and a back panel 14 supported in an upright, inclined position by a support member such as the base 16. The back panel 14 is generally parallel to and spaced a distance behind the front panel 12. In this way, the stand 10 can be used on any flat work surface.

Turning now to FIGS. 2–5 and with continuing reference to FIG. 1, the details of the construction of the device will be described. The front panel 12 is a large planar member with an exterior face 18 and an interior face 20. Formed along the center of the front panel 12 is at least one receiving opening 22. Preferably, several receiving openings 22 are provided in the front panel 12. Most preferably, there are three receiving openings 22 which are vertically aligned, as shown. As these receiving openings 22 are identically formed, only one will described herein.

The receiving opening 22 in the front panel 12 is adapted to receive the stem of a bouquet holder, in a manner yet to be described. To this end, the receiving opening 22 preferably is a horizontal slot with a notch 24 on the lower portion thereof. The edge 26 of the receiving opening 22 is beveled toward the base 16, as best shown in FIG. 5.

Preferably, the stand 10 is provided with a plurality of removable pegs 28 extending from the exterior face 18 of the front panel 12. The pegs 28 are removably received in peg holes 30 defined in the front panel 12. Preferably, the pegs 28 and the peg holes 30 are threadably coupled. In this way, the number and arrangement of the pegs 28 can be varied at the option of the florist depending on the type of floral device and other accessories being used by the florist, as will become apparent.

Referring still to FIGS. 1–5, the back panel 14 of the stand 10 also is a wide planar member of about the same overall size as the front panel 12. The back panel 14 has an interior face 32 and an exterior face 34. An elongate, vertical groove 36 is formed in the interior face 32 along the center line, so that the groove is aligned with the receiving openings 22 in the front panel 12.

In most instances it will desirable to provide the stand 10 with a handle for carrying the stand. To this end, the back panel 14 may be provided with a horizontal slot 38 located near the upper end. A notch 40 may be provided in the upper edge of the slot 38 for receiving a nail or hook. This allows the stand 10 to be hung from a wall or from some other vertical surface.

Figure 6:
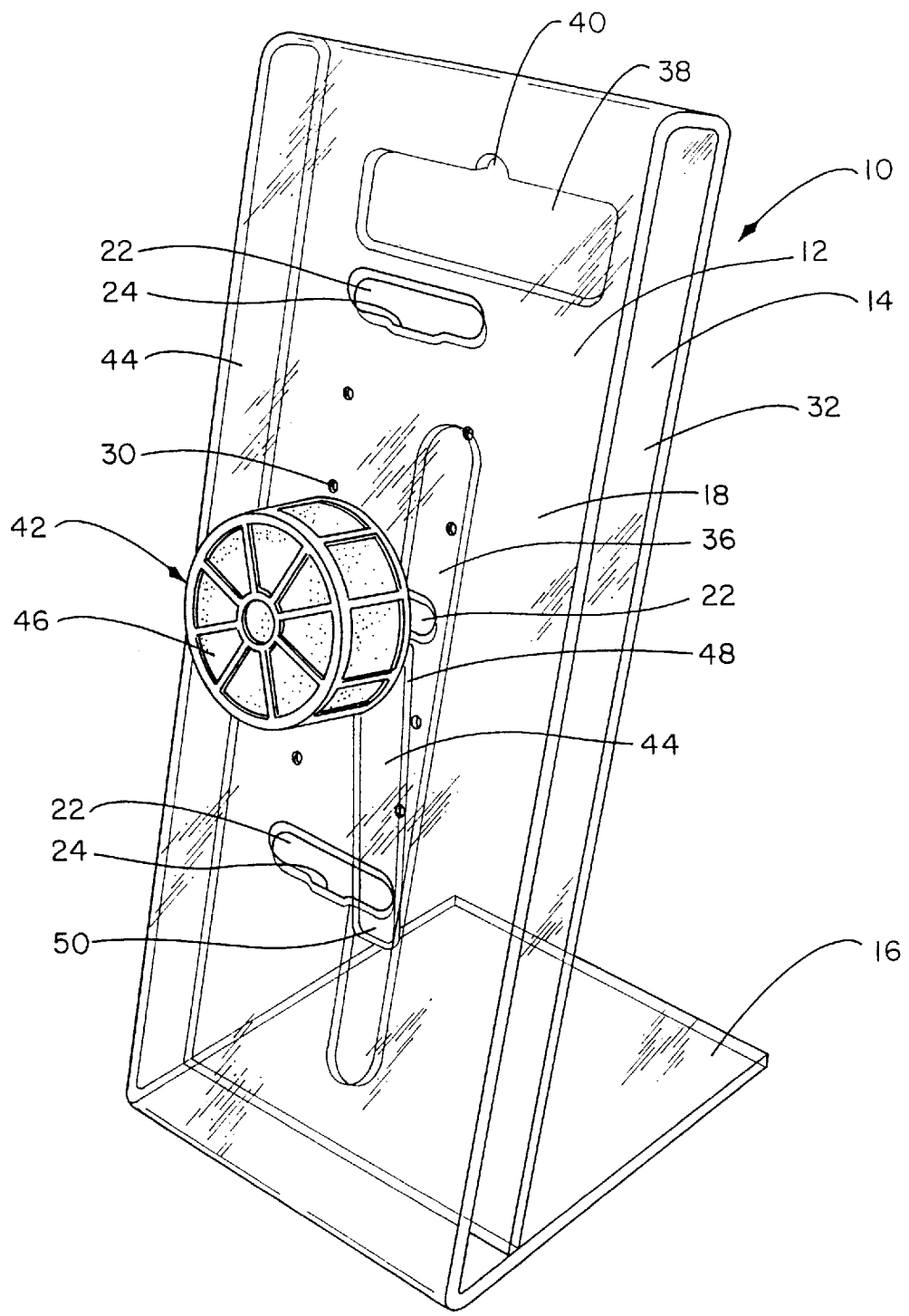
FIG. 6 is a right, frontal perspective view of the stand shown in FIG. 2.

Turning now to FIG. 6, the use of the stand 10 will be described. The stand 10 is shown here supporting a bouquet holder 42. A bouquet holder 42 generally comprises a elongate, resilient stem 44 having a floral portion 46 on one end 48. The floral portion 46 is a plastic cage filled with florist foam. The stem 44 tapers slightly towards the free end 50. A common type of bouquet holder is described in U.S. Pat. No. 5,454,189 issued in the name of Graham et. al., the contents of which are incorporated herein by reference.

The free end 50 of the bouquet holder 42 is inserted through the receiving opening 22 in the front panel 12 guided down the groove 36 in the back panel 14 until the upper end of the stem 48 is wedged into the notch 24 on the bottom edge of the receiving opening. Now it will be understood that the dimensions of the groove 36, the size of the notch 24, and the space between the front and back panels 12 and 14 should be selected to cause the stem 48 to be appressingly engaged between the front and back panels 12 and 14. The notch 24 on the bottom edge of the receiving opening 22 should be sized to mate with the upper end 48 of the stem 44. Further, the surface of the groove 36 may be roughened or textured in some manner to enhance the frictional contact between the stem 44 and the groove. With the stem 44 pressed into the stand 10 in this way, lateral and vertical movement of the stem and thus the bouquet holder is prevented.

Having installed the bouquet holder 42 in the stand 10, the floral arrangement can be completed. Where ribbons or other accessories are to be employed in the arrangement, pegs may be used to form loops or other configurations. As described previously, the pegs 28 can be used in any number and in any arrangement on the front panel 12.

Returning now to FIG. 1, therein illustrated is the use for the stand 10 for supporting a foam block 52 (shown in phantom). The pegs 28 are arranged according to the size and shape of the foam block selected for the particular arrangement to be made. Once the pegs 28 are placed in the peg holes 30 in the front panel 12, the foam block 52 is then oriented to the desired position and pressed onto the pegs 28. The floral arrangement then can be completed.

Whether using a foam block or a bouquet holder, florists often will attach decorative accessories to the floral arrangement by way of wires extending from the accessories. Usually, these wires are pushed through the foam block or bouquet holder and tied off behind the arrangement. Now it can be seen that the space between the front panel 12 and the back panel 14 allows the florist to manipulate the ends of wire extending behind the front panel 12. Yet, once the wires have been secured, they are covered by the back panel 14. This encloses the wires so that they do not become entangled with other nearby objects or floral assemblies, which is particularly advantageous during storage and shipment of the arrangement.

Although the functional aspects of the stand of this invention can be provided by several configurations, a most pleasing aesthetic effect is achieved by forming the stand of a single piece of transparent plastic. As shown, a single flat band of plastic can be cut to provide the desired receiving openings and handle slot, and then simply folded back on itself in the shape illustrated to form the upright stand. In addition to providing an attractive display stand, this integrally formed plastic piece is simple and inexpensive to manufacture.

Now it will be appreciated that the stand of the present invention provides the floral industry with an attractive and versatile support for holding floral devices during the formation of an arrangement. The stand is designed to maintain the floral device at a convenient height above a conventional work surface, and at a comfortable angle off vertical. Where a near flat support is desired the stand can be tipped over so that the base is vertical. The multiple receiving openings in the front of the stand allow the stand to hold a device at different heights or to hold multiple small arrangements, such as nosegays. The stand can be placed on any flat work surface, and can even be hung on a wall. Because of its versatility, the stand can be used to make arrangements, and to store, ship and display the arrangements, eliminating the extra devices otherwise required and the time and inconvenience associated therewith. The stand is attractive yet inconspicuous, so it can be used as a display at any event or ceremony without detracting from a particular floral theme.

Changes may be made in the combination and arrangement of the various parts and elements described herein without departing from the spirit and scope of the invention as defined in the following claims.

What is claimed is:

1. A stand for supporting a floral device, wherein the stand comprises:

a front panel having an interior face and an exterior face, wherein the front panel defines at least one receiving opening adapted to receive a portion of the floral device; and a back panel having an interior face and an exterior face, wherein the back panel is generally parallel to and spaced a distance behind the front panel, wherein the interior face of the back panel comprises an elongate groove, wherein the longitudinal axis of the groove is parallel to the back panel and aligned with the at least one receiving opening in the front panel.

2. The stand of claim 1 further comprising a support member adapted to support the front panel and the back panel in an upright position.

3. The stand of claim 1 wherein the front panel, the back panel, and the support member are integrally formed.

4. The stand of claim 1 wherein the at least one receiving opening in the front panel comprises a plurality of receiving openings and wherein the elongate groove in the interior surface of the back panel has a length sufficient to align with the plurality of receiving openings.

5. The stand of claim 1 wherein the receiving opening in the front panel is an elongate horizontal slot having a lower portion and wherein the lower portion defines a notch.

6. The stand of claim 1 wherein the front panel and the back panel are formed of transparent material.

7. The stand of claim 1 wherein the stand further comprises a plurality of pegs and wherein the front panel further comprises a plurality of peg holes adapted to removably receive the pegs.

8. The stand of claim 1 further comprising a handle on the back panel.

9. The stand of claim 8 wherein the handle is defined by a handle opening in the back panel.

10. A stand for supporting a bouquet holder having a floral portion attached to one end of a stem, the stand comprising:

a front panel having an interior face and an exterior face, wherein the front panel defines at least one receiving opening adapted to receive a free end of the stem of the bouquet holder so that the floral portion is supported on the exterior face of the front panel and the stem extends behind the front panel; and a back panel having an interior face and an exterior face, wherein the back panel is generally parallel to and spaced a distance behind the front panel, wherein the interior face of the back panel comprises an elongate groove, wherein the longitudinal axis of the groove is generally parallel to the back panel and aligned with the at least one receiving opening in the front panel, whereby the groove is adapted to receive and appressingly engage the free end of the stem of the bouquet holder so that the bouquet holder is stabilized in the stand.

11. The stand of claim 10 further comprising a support member adapted to support the front panel and the back panel in an upright position.

12. The stand of claim 10 wherein the at least one receiving opening in the front panel comprises a plurality of receiving openings, and wherein the elongate groove in the interior surface of the back panel has a length sufficient to receive the free end of the stem of the bouquet holder in any of the plurality of receiving openings.

13. The stand of claim 10 wherein the receiving opening in the front panel is an elongate horizontal slot having a lower portion and wherein the lower portion of the slot defines a notch adapted to engage the end one of the stem of the bouquet holder adjacent the floral portion when the stem is positioned in the stand.

14. The stand of claim 10 wherein the front panel and the back panel are formed of transparent material.

15. The stand of claim 10 wherein the stand further comprises a plurality of pegs and wherein the front panel further comprises a plurality of peg holes adapted to removably receive the pegs.

16. The stand of claim 10 wherein the front panel, the back panel, and the support member are integrally formed.

17. The stand of claim 10 further comprising a handle on the back panel.

18. The stand of claim 17 wherein the handle is defined by a handle opening in the back panel.

19. A bouquet holder assembly comprising:

a bouquet holder comprising a floral portion attached to one end of an elongate, resilient stem; and a stand comprising:

a front panel having an interior face and an exterior face, wherein the front panel defines at least one receiving opening adapted to receive a free end of the stem of the bouquet holder so that the floral portion is supported on the exterior face of the front panel and the stem extends behind the front panel; and a back panel having an interior face and an exterior face, wherein the back panel is generally parallel to and spaced a distance behind the front panel, wherein the interior face of the back panel comprises an elongate groove, wherein the longitudinal axis of the groove is parallel to the back panel and aligned with the at least one receiving opening in the front panel, whereby the groove is adapted to receive and appressingly engage the free end of the stem of the bouquet holder so that the bouquet holder is stabilized in the stand.

20. The assembly of claim 19 further comprising a support member adapted to support the front panel and the back panel in an upright position.

21. The assembly of claim 20 wherein the front panel, the back panel, and the support member are integrally formed.

22. The assembly of claim 19 wherein the at least one receiving opening in the front panel comprises a plurality of receiving openings, and wherein the elongate groove in the interior surface of the back panel has a length sufficient to receive the free end of the stem of the bouquet holder in any of the plurality of receiving openings.

23. The assembly of claim 19 wherein the receiving opening in the front panel is an elongate horizontal slot having a lower portion and wherein the lower portion of the slot defines a notch adapted to engage the one end of the stem of the bouquet holder adjacent the floral portion when the stem is positioned in the stand.

24. The assembly of claim 19 wherein the front panel and the back panel are formed of transparent material.

25. The assembly of claim 19 wherein the stand further comprises a plurality of pegs and wherein the front panel further comprises a plurality of peg holes adapted to removably receive the pegs.

26. The assembly of claim 19 further comprising a handle on the back panel.

27. The assembly of claim 26 wherein the handle is defined by a handle opening in the back panel.

* * * * *